(12) United States Patent
Bae et al.

(10) Patent No.: US 6,507,452 B1
(45) Date of Patent: Jan. 14, 2003

(54) FILTERING APPARATUS FOR HARD DISK DRIVE

(75) Inventors: Byoung-young Bae, Pyeongtaek (KR); Soon-kyo Hong, Seoul (KR); Seong-hoon Kim, Seongnam (KR); Sung-jin Lee, Kwangmyung (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/480,660

(22) Filed: Jan. 11, 2000

(30) Foreign Application Priority Data

Jan. 12, 1999 (KR) .................................................. 99-532

(51) Int. Cl.[7] ............................................. G11B 17/02
(52) U.S. Cl. .................................................. 360/97.02
(58) Field of Search ........................................ 360/97.2

(56) References Cited

U.S. PATENT DOCUMENTS

| | | | | |
|---|---|---|---|---|
| 5,023,733 A | * | 6/1991 | Koga et al. | 360/97.02 |
| 5,101,305 A | * | 3/1992 | Ohkita et al. | 360/97.02 |
| 5,764,435 A | * | 6/1998 | Sugimoto et al. | 360/97.02 |
| 6,108,164 A | * | 8/2000 | Weber, Jr. | 360/97.02 |

* cited by examiner

*Primary Examiner*—George J. Letscher
(74) *Attorney, Agent, or Firm*—Sughrue Mion, PLLC (57) ABSTRACT

A filtering apparatus for a hard disk drive includes a housing in which a hard disk is rotatably installed, a filter for filtering particles from air flowing in the housing, and a holder installed at the top and bottom of the inside of the housing for supporting the filter by encompassing an upper portion and a lower portion thereof, so that a gap is not generated between the filter and the top, and between the filter and the bottom.

6 Claims, 11 Drawing Sheets

III — III

FILTERING APPARATUS FOR HARD DISK DRIVE

BACKGROUND OF THE INVENTION

1. Field of the Invention

The present invention relates to a filtering apparatus for a hard disk drive which enables filtering of particles in a housing accommodating a hard disk.

2. Description of the Related Art

Figure 1A:
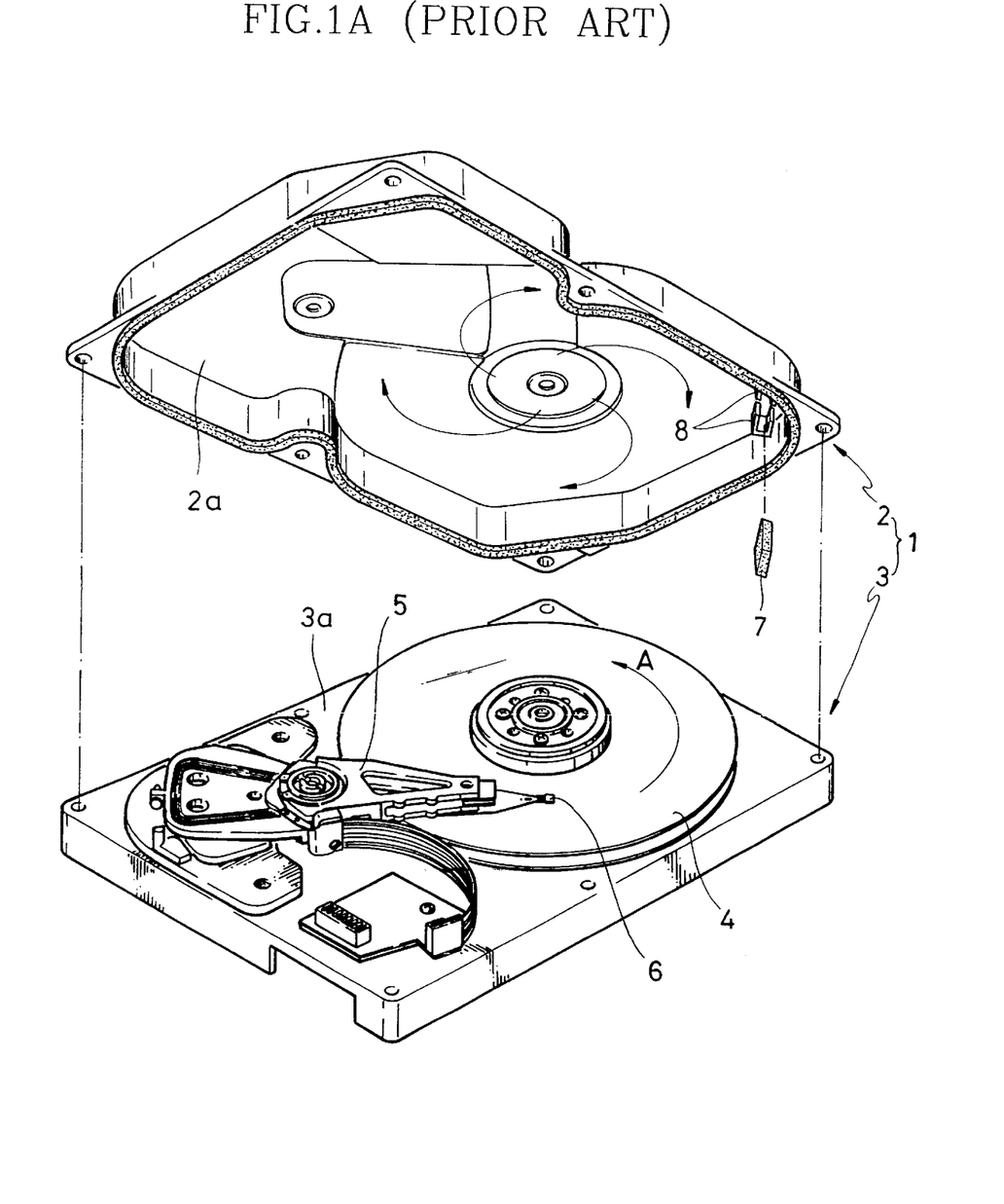
FIGS. 1A and 2A are an exploded perspective view and a plan view, respectively, showing a hard disk drive adopting a conventional filtering apparatus.

In general, a hard disk drive is used as an auxiliary memory device of a computer. FIG. 1A shows a conventional hard disk drive. Referring to the drawing, the conventional hard disk drive includes a housing 1, a hard disk 4 installed in the housing 1 and a filtering apparatus.

The housing 1 includes a base 3 where the hard disk 4 is rotatably installed, and a cover member 2 coupled to the base 3 from above to protect the hard disk 4. Normally, hard disks are installed in multiple layers to store a large amount of information. A head 6 installed at an end portion of an actuator arm 5 records or reproduces information on or from the hard disk 4 rotating at high speed.

The filtering apparatus is for filtering particles such as dust unnecessarily existing in the housing 1. The filtering apparatus includes a filter 7, and a holder 8 provided at the bottom 2*a* of the cover member 2.

The filter 7 has a structure like that of a sponge to facilitate filtering of particles. The filter 7 is supported by being encompassed by the holder 8. The holder 8 is formed to protrude from the bottom 2*a* of the cover member 2. The holder 8 is provided as a pair of holders which are separated a predetermined distance from each other to support the filter 7 from both sides thereof.

In the above structure, when the hard disk 4 rotates at high speed in a direction indicated by an arrow A, particles in the housing 1 flow with air along with the rotation of the hard disk 4. The flowing particles are moved toward the edge side of the cover member 2 and filtered by the filter 7.

Figure 1B:
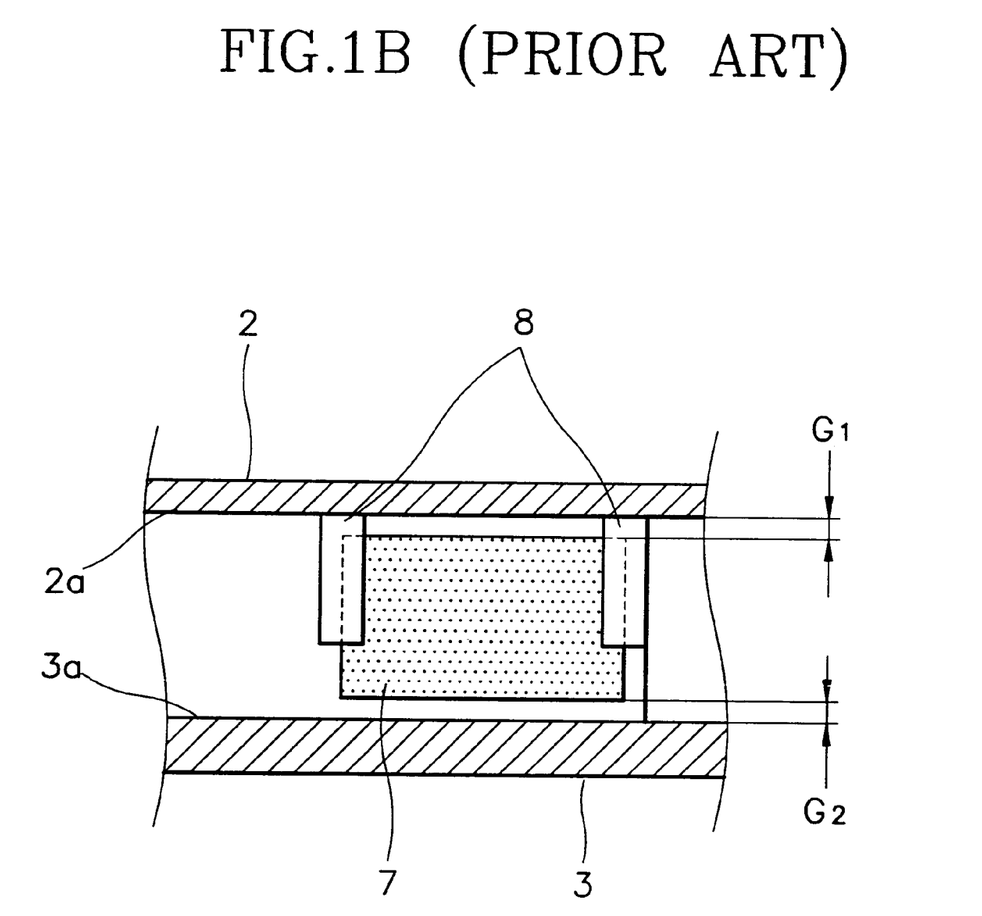
FIGS. 1B and 2B are sectional views showing a part of each of FIGS. 1A and 2A, respectively.

However, in the conventional filtering apparatus having the above structure, the holder 8 is formed to protrude from the bottom 2*a* of the cover member 2 only. Thus, as shown in FIG. 1B, gaps G1 and G2 are formed between the filter 7 and the bottom 2*a* of the cover member 2, and the filter 7 and the upper surface 3*a* of the base 3, respectively. As the particles in the housing 1 pass through the gaps G1 and G2 without being filtered, the filtering performance of the filter 7 is lowered.

Figure 2A:
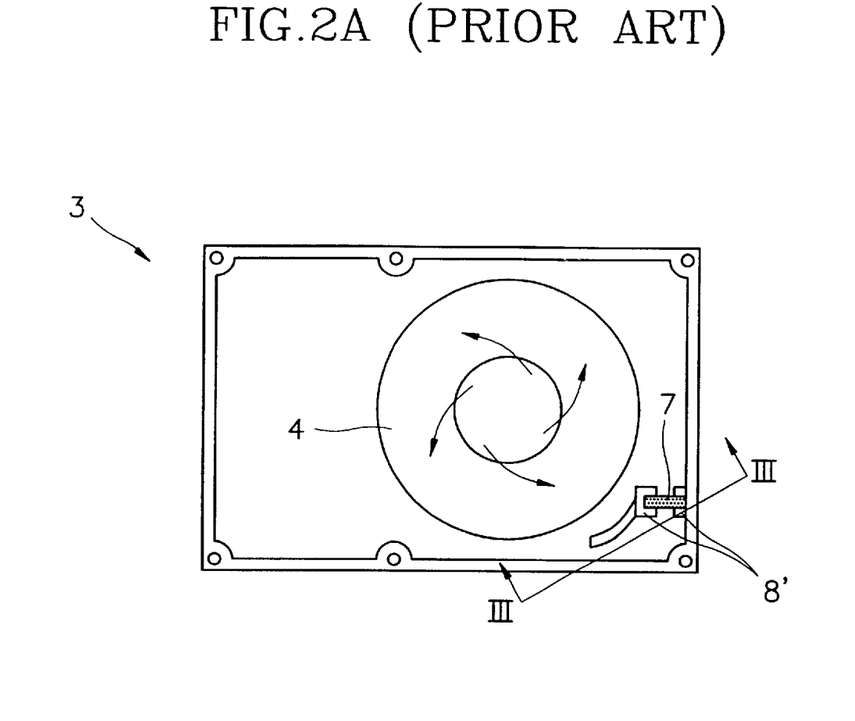
Figure 2B:
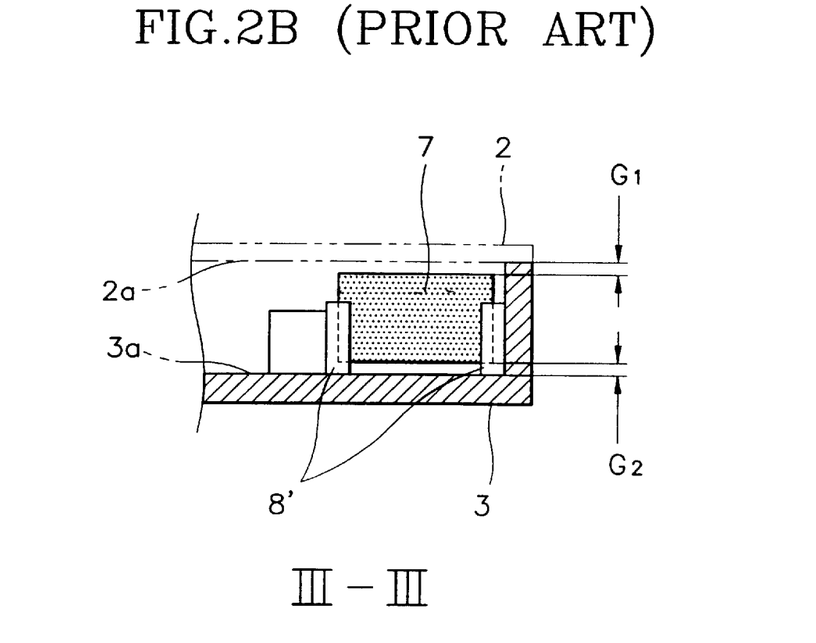

A shown in FIGS. 2A and 2B, another conventional filtering apparatus has been adopted in a hard disk drive, in which a holder 8' is provided on an upper surface 3*a* of the base and the filter 7 is supported by the holder 8'. In this case, however, gaps G1 and G2 are formed between the filter 7 and the bottom 2*a* of the cover member 2, and the filter 7 and the upper surface 3*a* of the base 3, respectively, so that the filtering performance of the filter 7 is also lowered.

SUMMARY OF THE INVENTION

To solve the above problems, it is an objective of the present invention to provide a filtering apparatus for a hard disk drive in which the structure of a holder is improved so that the effect of filtering is improved.

Accordingly, to achieve the above objective, there is provided a filtering apparatus for a hard disk drive which comprises a housing in which a hard disk is rotatably installed, a filter for filtering particles from air flowing in the housing, and a holder installed at the top and bottom of the inside of the housing for supporting the filter by encompassing an upper portion and a lower portion thereof, so that a gap is not generated between the filter and the top, and between the filter and the bottom.

It is preferred in the present invention that the holder comprises a main holder protruding from the top of the inside of the housing and having a support groove for supporting the filter by encompassing one end portion of the filter, and an auxiliary holder protruding from the bottom of the inside of the housing corresponding to the main holder and having an accommodating groove for supporting the filter by encompassing the other end portion of the filter.

It is preferred in the present invention that the main holder comprises a pair of main support portions protruding to a predetermined height from the top of the inside of the housing and separated a predetermined distance from each other, and an auxiliary support portion formed between the main support portions to be lower in height than the main support portions, wherein the support groove is formed throughout the main support portions and the auxiliary support portion.

It is preferred in the present invention that the main holder and the auxiliary holder are formed to have the same height, each of which comprises a pair of main support portions protruding from the top and bottom of the inside of the housing to a predetermined height and at a predetermined interval, and an auxiliary support portion formed between the main support portions to be lower in height than the main support portions, wherein the support groove and the accommodating groove are formed throughout the main support portions and the auxiliary support portion.

It is preferred in the present invention that the holder comprises a main holder protruding from the bottom or the top of the inside of the housing and having a support groove for supporting the filter by encompassing one end portion of the filter, and an accommodating portion formed to be indented from the bottom or top of the inside of the housing corresponding to the main holder, for supporting the filter by encompassing the other end portion of the filter.

It is preferred in the present invention that the holder comprises a main holder protruding from the bottom or the top of the inside of the housing and having a support groove for supporting the filter by encompassing an edge of the filter, and a sealing member for forming a seal between the main holder or the top of the inside of the housing, and between the main holder and the bottom.

It is preferred in the present invention that an opening through which air passes is formed at the main holder and a support groove is formed at an inner surface of the opening.

It is preferred in the present invention that the filtering apparatus for a hard disk drive further comprises an actuator arm installed in one of the corner portions in the housing and capable of pivoting across the hard disk, and when a corner portion which is diagonal to the actuator arm in the housing is defined to be a first corner and a corner portion which is close to the first corner in a direction in which the hard disk rotates is defined to be a second corner, the holder is installed in the second corner.

It is preferred in the present invention that the filtering apparatus for a hard disk drive further comprises a first guide portion, extended from one side of the holder to face the hard disk and maintain a predetermined angle with an input surface of the filter, for guiding air flowing in the housing toward the input surface of the filter, and a second guide portion, extended from the other side of the holder to face the hard disk and maintain a predetermined angle with a rear surface of the filter, to prevent the air from flowing back to the rear surface of the filter.

According to another aspect of the present invention, there is provided a filtering apparatus for a hard disk drive which comprises a housing including a base on which a hard disk is rotatably installed and a cover member coupled to the base from above, a filter for filtering particles from air flowing in the housing, and a holder, installed at a bottom of the cover member and an upper surface of the base, for supporting the filter by encompassing one end portion and the other end portion of the filter, so that a gap is not generated between the filter and the bottom of the cover member, and between the filter and the ceiling of the base.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 3A:
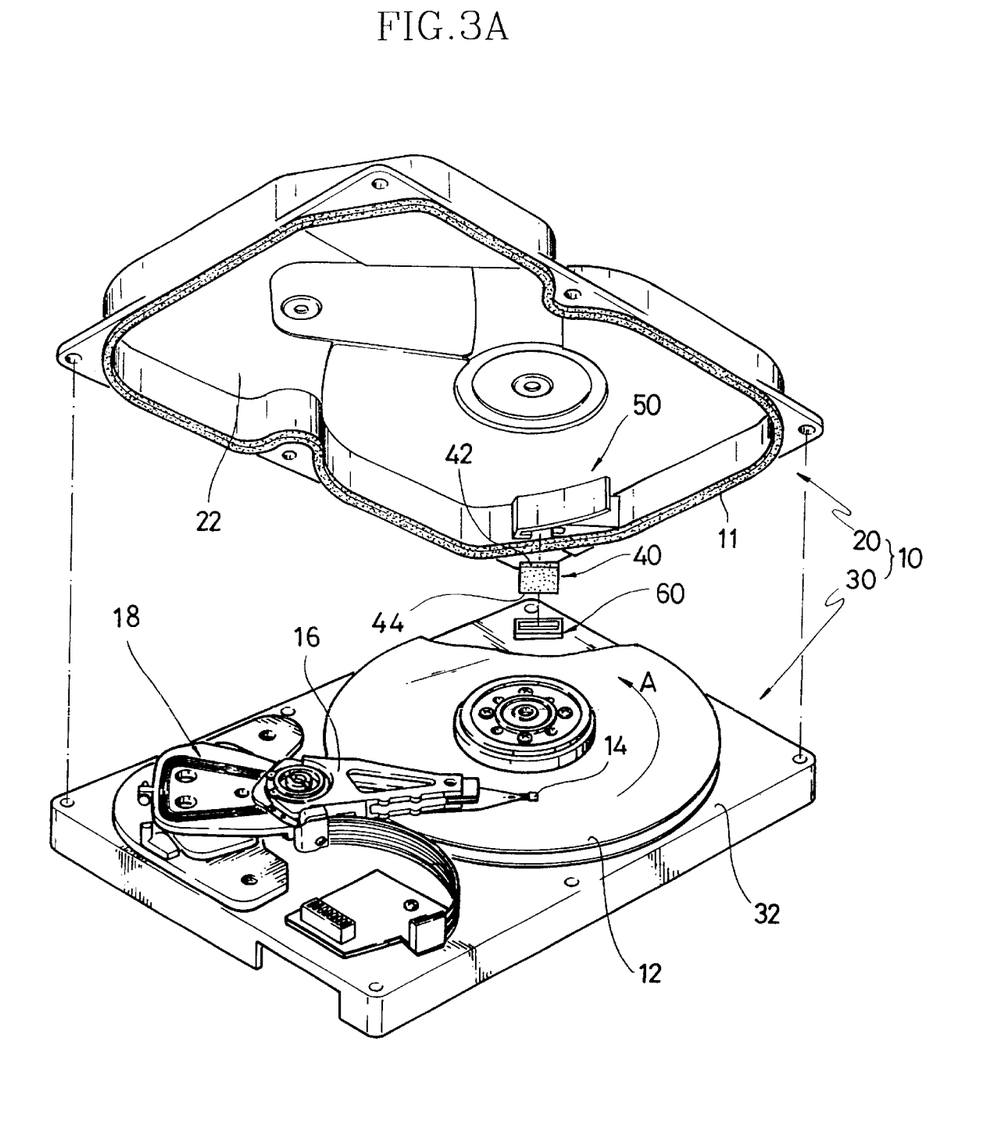
FIG. 3A is an exploded perspective view showing a filtering apparatus for a hard disk drive according to a first preferred embodiment of the present invention.
Figure 3B:
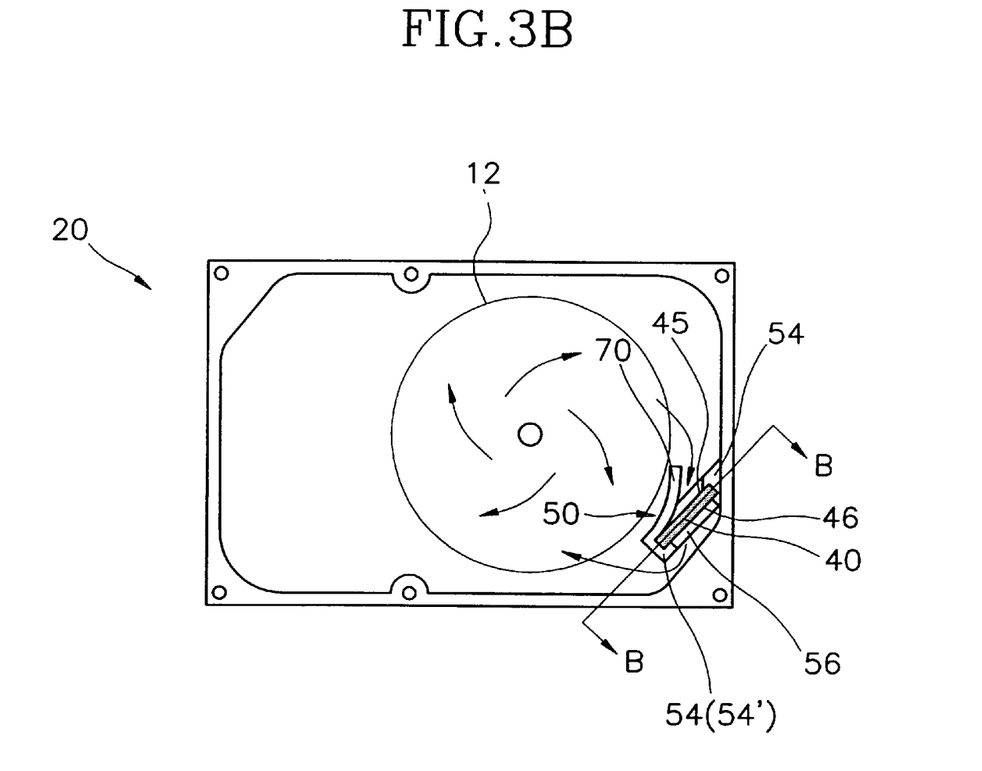
FIG. 3B is a bottom view of the cover member shown in FIG. 3A.

FIG. 3A is an exploded perspective view of a filtering apparatus for a hard disk drive according to a first preferred embodiment of the present invention, and FIG. 3B is a bottom view of the cover member shown in FIG. 3A.

Referring to FIGS. 3A and 3B, a hard disk 12 and an actuator arm 16 are installed in a housing 10. The housing 10 includes a base 30 for supporting the hard disk 12 and a cover member 20 coupled to the base 30 from above. A gasket 11 is interposed between the base 30 and the cover member 20. Usually, the recording medium is composed of multiple hard disks in a stacked structure and the hard disks are rotated at high speed by a driving force of a spindle motor (not shown). A head 14 which is a recording/reproducing device is installed at an end portion of the actuator arm 16. The actuator arm 16 pivots by a driving force of a voice coil motor 18 installed on the base 30. When the actuator arm 16 pivots, the head 14 moves across the hard disk 12.

Also, a filter 40 and a holder for supporting the filter 40 are provided in the housing 10. The filter 40 is for filtering particles such as dirt included in air in the housing 10. Thus, the filter 40 has the structure of a typical sponge which is light and cheap.

Figure 3C:
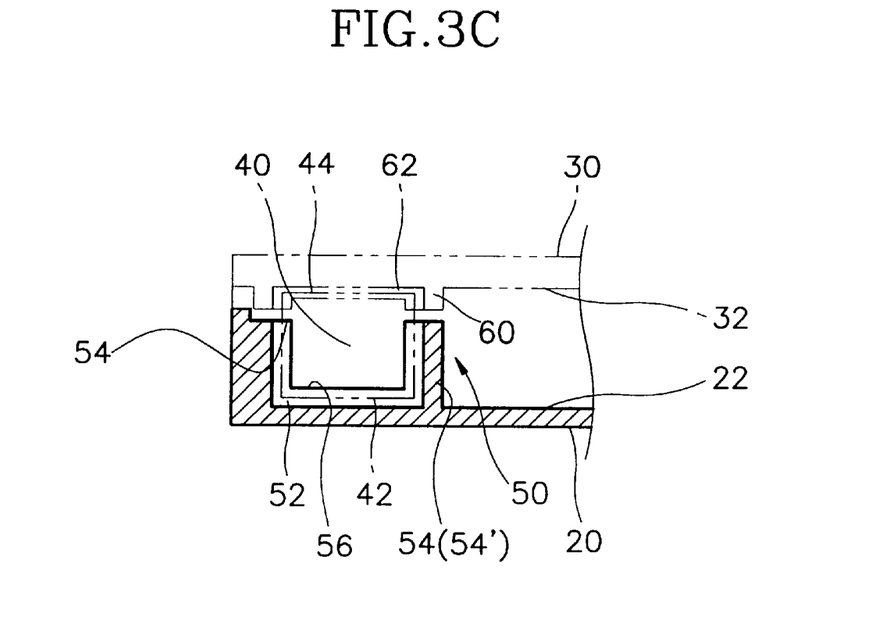
FIG. 3C is a sectional view taken along line B—B of FIG. 3B.

The holder supports the filter 40 such that no gaps are generated between the filter 40 and an upper surface 32 of the base 30, and the filter 40 and a bottom 22 of the cover member 20. The holder, as shown in FIG. 3C, includes a main holder 50 formed on the cover member 20 and an auxiliary holder 60 formed on the base 30.

The main holder 50 includes a pair of main support portions 54 protruding from the bottom 22 of the cover member 20. The main support portions 54 support the side portion of the filter 40. Each of the main support portions 54 is a column shape protruding to a predetermined height and separated a predetermined distance from each other. An auxiliary support portion 56 is formed between the main support portions 54 to a height lower than the main support portion 54. Also, a support groove 52 is formed throughout the main support portion 54 and the auxiliary support portion 56. One end portion 42 and part of both side end portions of the filter 40 are inserted into the support groove 52 and supported thereby. Thus, generation of a gap between the filter 40 and the bottom 22 is prevented.

The auxiliary holder 60 protrudes from the upper surface 32 of the base 30 to correspond to the main holder 50. An accommodating groove 62 in which the other end portion 44 of the filter 40 is inserted and supported thereby is formed in the auxiliary holder 60. As the filter 40 is inserted into the accommodating groove 62, generation of a gap between the upper surface 32 and the other portion 44 of the filter 40 is prevented.

Also, a guide portion 70 (see FIG. 3B) for guiding the air flowing in the housing 10 toward an input surface 45 of the filter 40 where the flowing air is input, is formed on the main holder 50. The guide portion 70 is formed by being extended from a main support portion 54' of the main support portions 54 which is close to the hard disk 12. Also, the guide portion 70 is formed to maintain a predetermined angle with respect to the input surface 45 in order to smoothly guide the flowing air toward the input surface 45. Preferably, the angle between the guide potion 70 and the input surface 45 makes an acute angle.

Although the main holder 50 and the auxiliary holder 60 are formed on the cover member 20 and the base 30, respectively, in the above embodiment, it is possible to form the main holder 50 and the auxiliary holder 60 on the base 30 and the cover member 20, respectively.

In the operation and effect of the filtering apparatus according to the first preferred embodiment of the present invention having the above structure, when information is recorded on or reproduced from the hard disk 12, as shown in FIG. 3A, the hard disk 12 rotates at high speed. Here, the air in the housing 10 flows in a direction indicated by arrow A which is the same as the rotation direction of the hard disk 12. Part of the flowing air is guided by the guide portion 70, as shown in FIG. 3B. Here, unlike the conventional technology, as no gaps exist between the filter 40 and the upper surface 32, and the filter 40 and the bottom 22, all the guided air is input to the input surface 45 of the filter 40 and exhausted from a rear surface 46 of the filter 40. Thus, most particles in the flowing air are filtered by the filter 40 and clean air passes through. Consequently, the filter 40 more effectively filters out particles in the flowing air, compared to the conventional technology, so that contamination of the hard disk 12 and the head 14 due to the particles can be reduced. Also, as contamination of the hard disk 12 and the head 14 is reduced, malfunction or errors generated to the elements in the hard disk drive can be reduced.

Figure 4A:
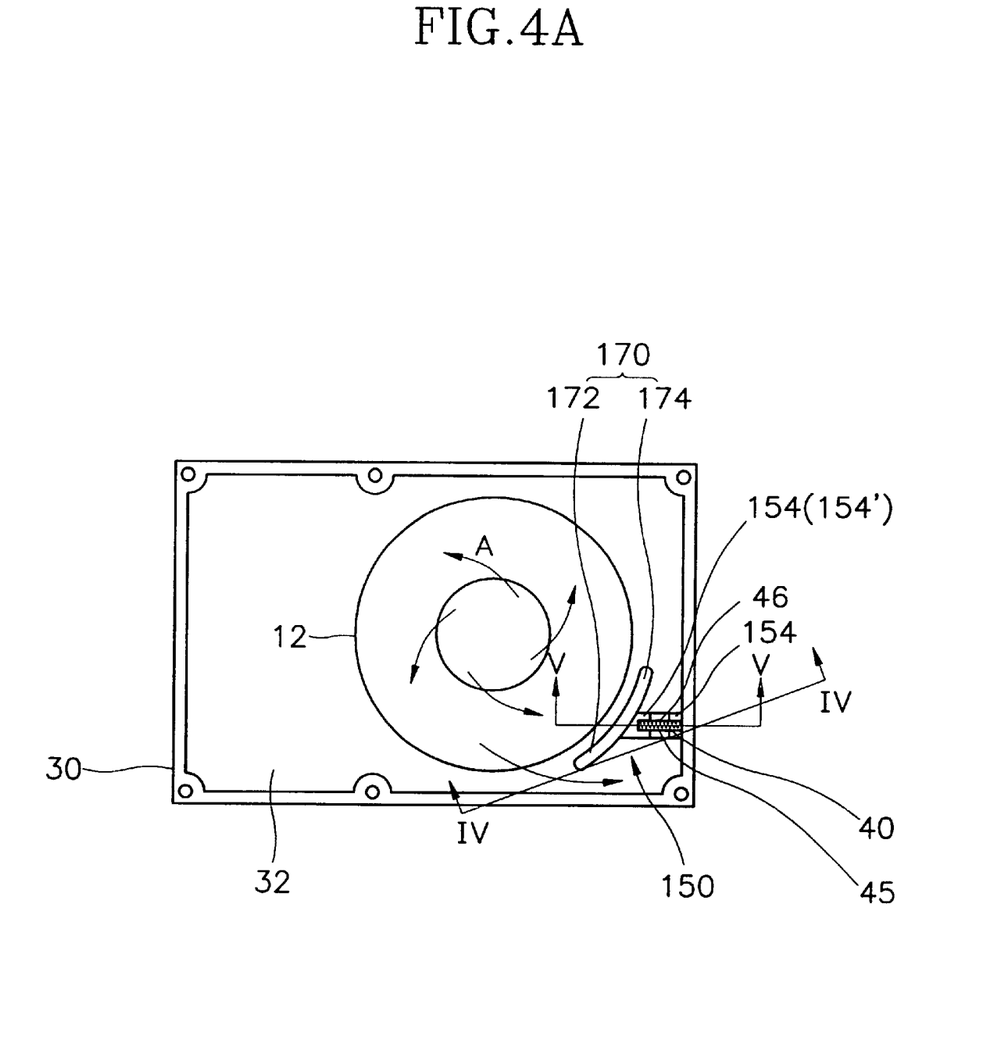
FIG. 4A is a plan view showing a part of a hard disk drive according to a second preferred embodiment of the present invention.
Figure 4B:
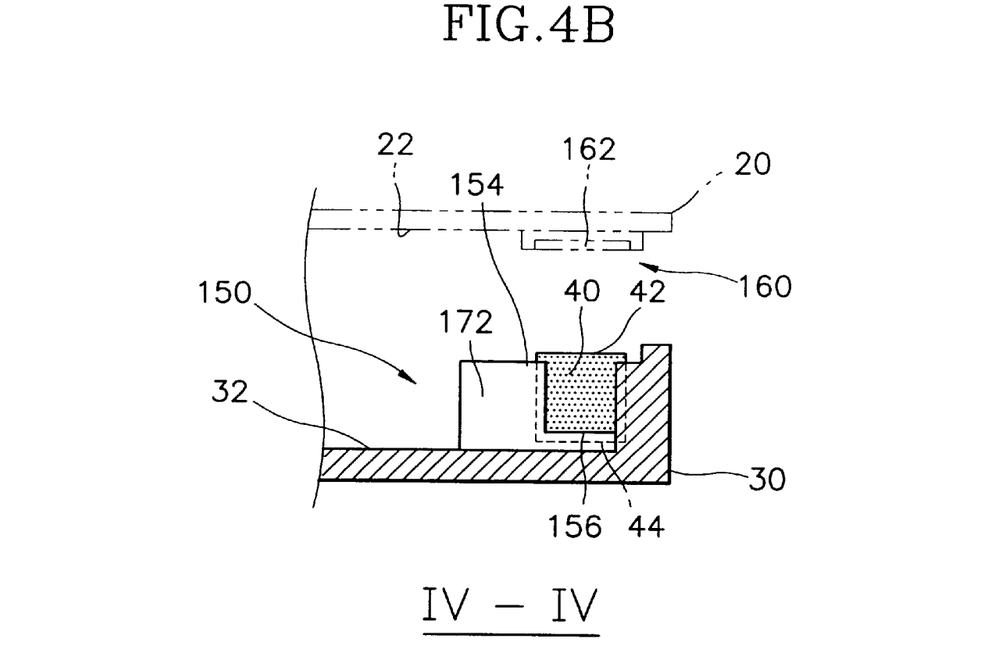
FIG. 4B is a sectional view taken along line IV—IV of FIG. 4A.

FIG. 4A is a plan view of a filtering apparatus for a hard disk drive according to a second preferred embodiment of the present invention; FIG. 4B is a sectional view taken along line IV—IV of FIG. 4A; and FIG. 4C is a sectional view taken along line V—V of FIG. 4A.

Figure 4C:
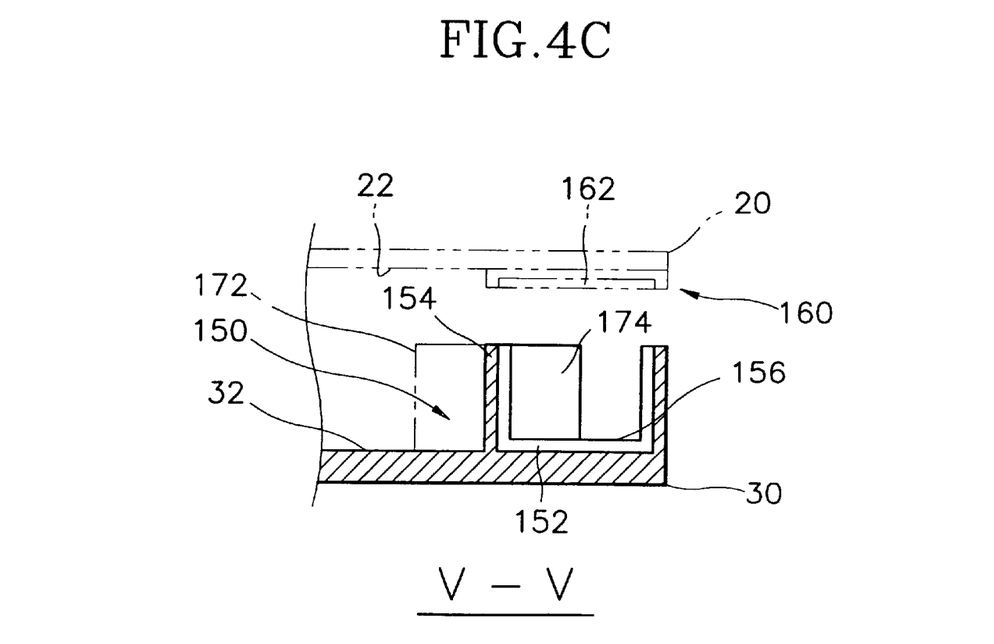
FIG. 4C is a sectional view taken along line V—V of FIG. 4A.

Referring to FIGS. 4A, 4B and 4C, a filtering apparatus according to a second preferred embodiment of the present invention includes a main holder 150 formed on the base 30 for supporting the filter 40, and an auxiliary holder 160 formed on the cover member 20.

The main holder 150 has almost the same structure as that of the main holder 50 shown in FIG. 3A. Thus, the main holder 150 includes a pair of main support portions 154 protruding from the upper surface 32 of the base 30 in a column shape, and an auxiliary support portion 156 formed between the main support portions 154. A support groove 152 is formed throughout the main and auxiliary support portions 154 and 156. The other end portion 44 and both side portions of the filter 40 are inserted into the support groove 152. Thus, a gap does not exist between the other end portion 44 of the filter 40 and the bottom 32 of the cover member 30. The auxiliary support portion 156 is formed integrally with the main support portion 154 and to have a height lower than the main support portion 154.

The auxiliary holder 160 protrudes from the bottom 22 of the cover member 20 to correspond to the main holder 150. An accommodating groove 162 for accommodating one end portion 42 of the filter 40 is formed in the auxiliary holder 160. As the filter 40 is inserted into the accommodating groove 162, a gap is not formed between the bottom 22 of the cover member 20 and the filter 40.

Also, a guide portion 170 for guiding the air flowing in the housing 10 is integrally formed with the main holder 150. In particular, the guide portion 170 is formed at both sides of a main support portion 154' closer to the hard disk 12. Also, the guide portion 170 includes a first guide portion 172 for guiding the flowing air toward the input surface 45 of the filter 40, and a second guide portion 174 for preventing air from flowing back toward the rear surface 46 of the filter 40. Thus, each of the first and second guide portions 172 and 174 extends in the opposite directions with respect to the main support portion 154'. The first guide portion 172 is formed to make an obtuse angle with the input surface 45 while the second guide portion 174 is formed to make an acute angle with respect to the rear surface 46.

Here, it is possible to switch the positions of the main holder 150 and the auxiliary holder 160.

Figure 5:
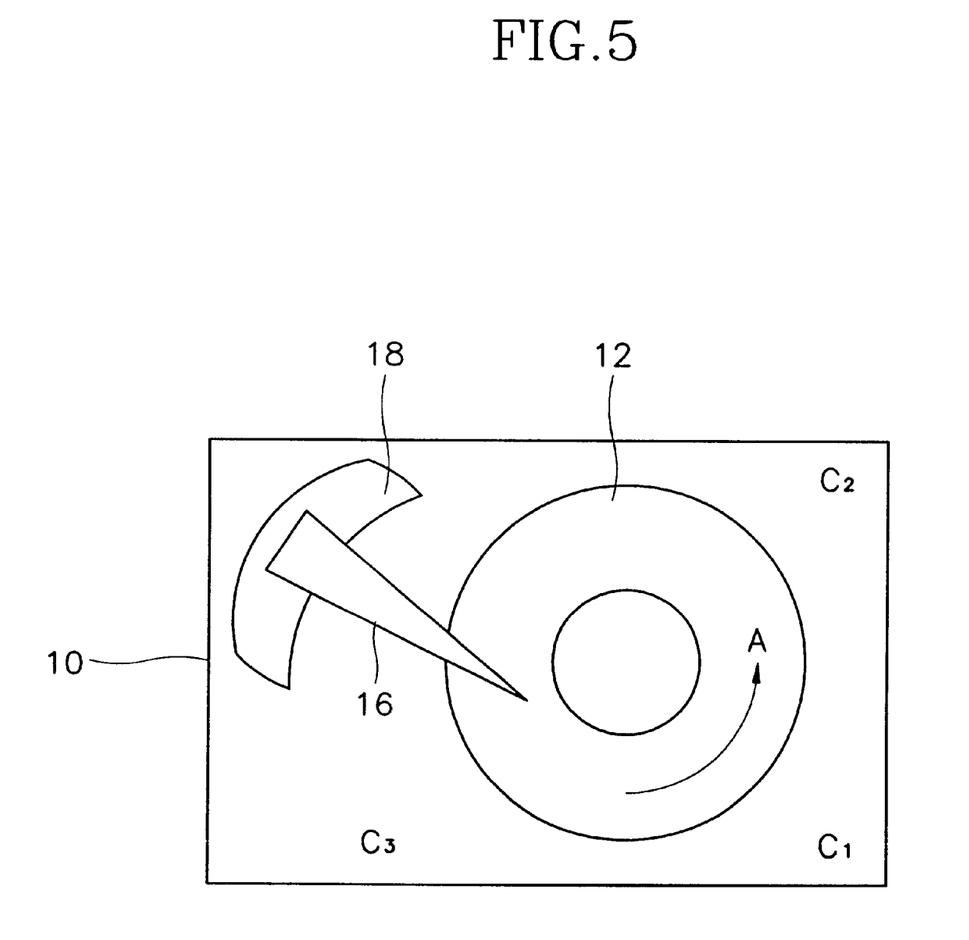
FIG. 5 is a schematic view showing the structure of a hard disk drive for explaining the position of an actuator arm.
Figure 6A:
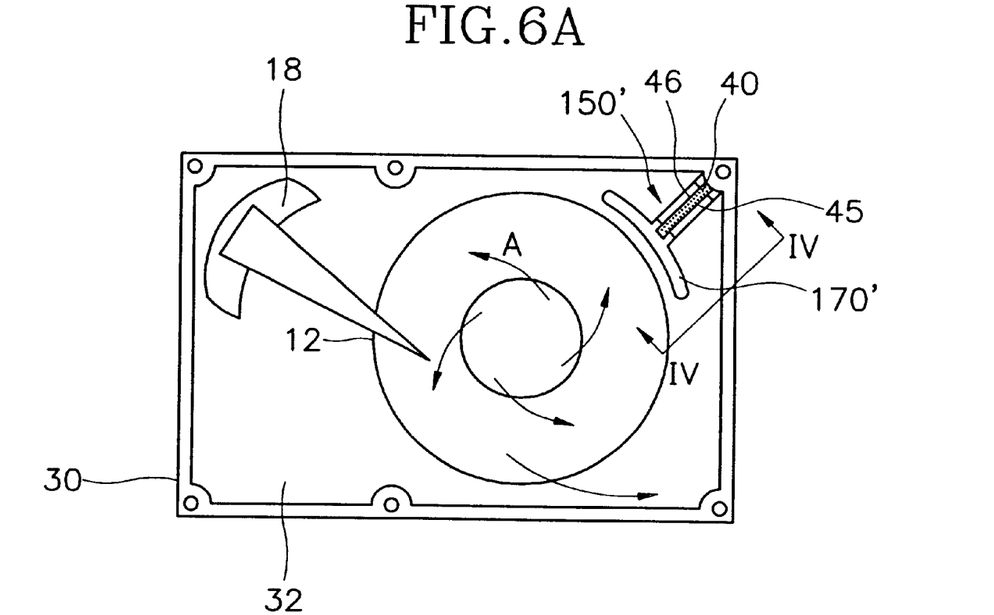
FIG. 6A is a sectional view showing a filtering apparatus according to a third preferred embodiment of the present invention.
Figure 6B:
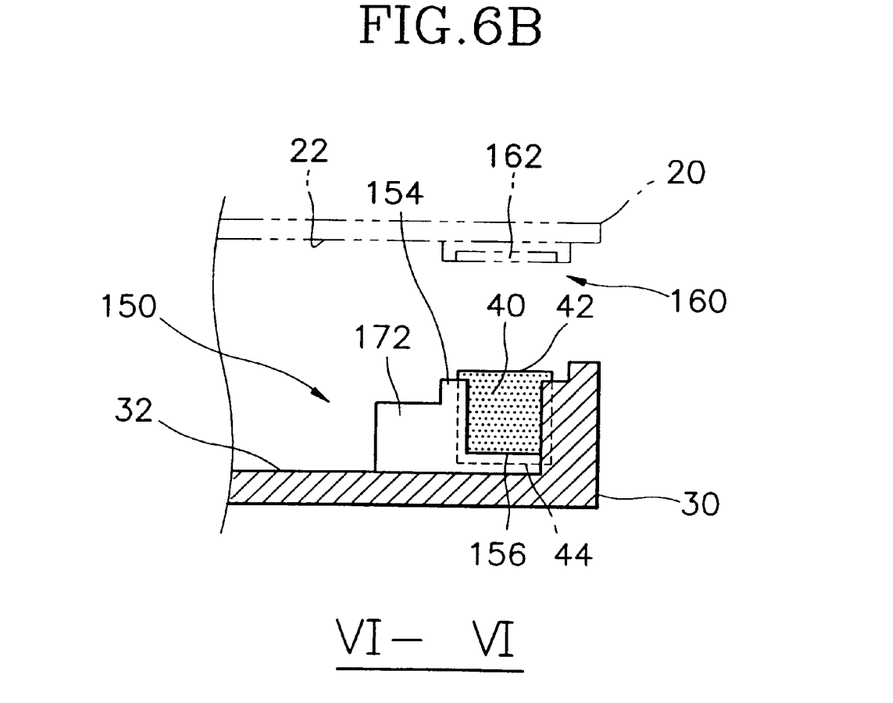
FIG. 6B is a sectional view taken along line VI—VI of FIG. 6A.

Referring to FIG. 5, in the housing 10, a corner portion which is diagonal to the actuator arm 16 is defined to be a first corner C1 a corner portion which is close to the first corner Cl in the rotation direction of the hard disk 12 is defined to be a second corner C2; and a corner portion which is close to the actuator arm 16 in the rotation direction of the hard disk 12 is defined to be a third corner C3. Here, as shown in FIG. 6A, the main holder 150' and the filter 40 are preferably installed at the second corner C2. In this case, as shown in FIG. 6B, an auxiliary holder 160' is installed at the second corner C2. Here, the shapes of the holders 150' and 160' are slight modifications of the holders 150 and 160 shown in FIG. 4B. However, as the holders 150' and 160' are substantially the same as the holders 150 and 160 in the structure of encompassing and supporting both end potions 42 and 44 of the filter 40, only the characteristic features will be described.

The main holder 150' is formed in the second corner C2 to direct the rotation center of the hard disk 12. Also, a guide portion 170' for guiding the flow of air is formed to face the hard disk 12 of the main holder 150'. The guide portion 170' forms an angle of about 90° with respect to the input surface 45 and the rear surface 56 of the filter 40.

Figure 7:
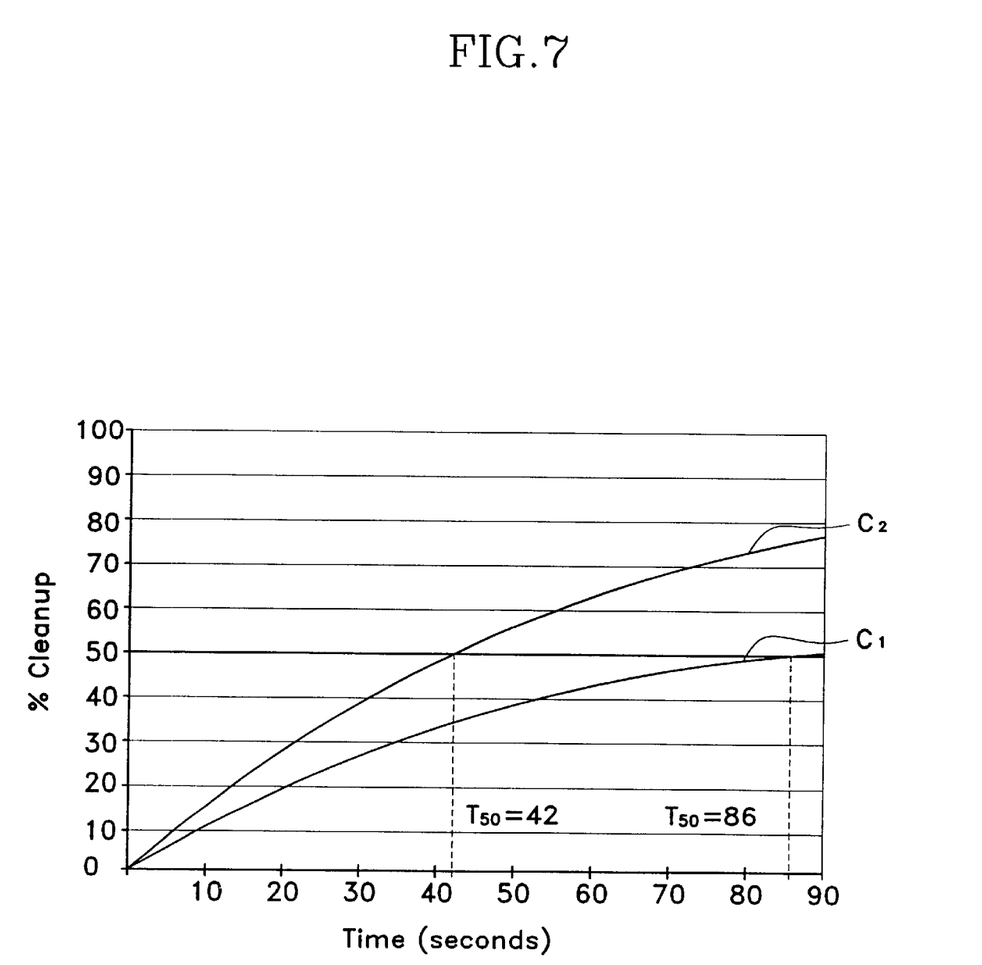
FIG. 7 is a graph showing the filtering performance of the filtering apparatus shown in FIG. 6A.

When the filter 40 is installed in the second corner C2, a higher filtering performance can be obtained than when being installed in the first corner Cl or the third corner C3. The filtering performance will be described with reference to FIG. 7. FIG. 7 is a graph showing a comparison of filtering performances, TTCU (time to clean-up), in the first corner Cl and the third corner C3. Here, in the TTCU, the time needed for filtering 50% of particles existing in a predetermined space is expressed by an absolute sign $T_{50}$.

As can be seen from the graph, the TTCU in the case of installing the filter 40 in the second corner C2 is 42 ($T_{50}$=42), which is superior to the TTCU in the first corner C1 ($T_{50}$=86). Thus, the filtering time can halved.

In FIG. 7, the reason for comparing the TTCU only in the first and second corners C1 and C2 is that the amount of air flow in the third corner C3 is relatively smaller than those in the first and second corners C1 and C2. That is, as the hard disk 12 usually rotates in a direction indicated by arrow A, the amount of air flow is smaller in the third corner C3 where a vortex is necessarily generated due to the actuator arm 16 while the amount of air flow is large in the first and second corners C1 and C2. Thus, it is easier to remove particles in the first and second corners C1 and C2.

Figure 8:
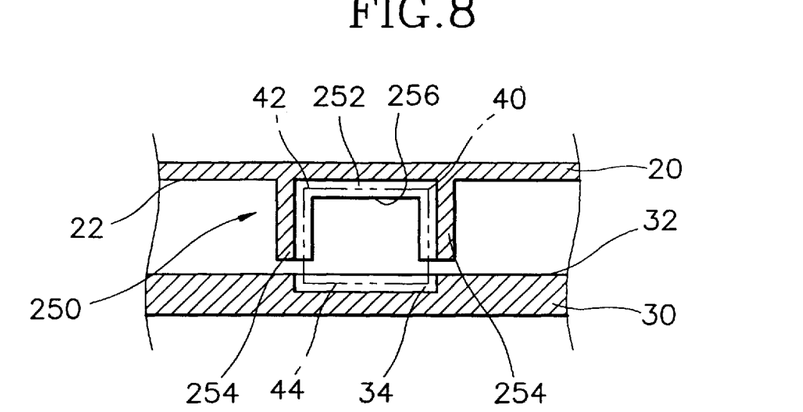
FIG. 8 is a sectional view showing a filtering apparatus for a hard disk drive according to a fourth preferred embodiment of the present invention.

FIG. 8 is a sectional view showing a filtering apparatus for a hard disk drive according to a fourth preferred embodiment of the present invention. Referring to the drawing, in a filtering apparatus according to the fourth preferred embodiment, a holder for supporting the filter 40 includes a main holder 250 formed on the cover member 20 and an accommodating portion 34 formed on the base 30.

The main holder 250 includes a pair of main support portion 254 formed to protrude from the bottom 22 of the cover member 20, and an auxiliary support portion 256 formed between the main support portions 254. A support groove 252 is formed throughout the main support portion 254 and the auxiliary support portion 256, and one end portion 42 and part of both side portions of the filter 40 are inserted therein. The accommodating portion 34 is formed to be indented in the upper surface 32 of the base 30 to correspond to the main holder 250. The other end portion 44 of the filter 40 is inserted in the accommodating portion 34 and supported thereby. Thus, no gaps are generated between the filter 40 and the bottom 22 and the filter 40 and the upper surface 32.

Figure 9:
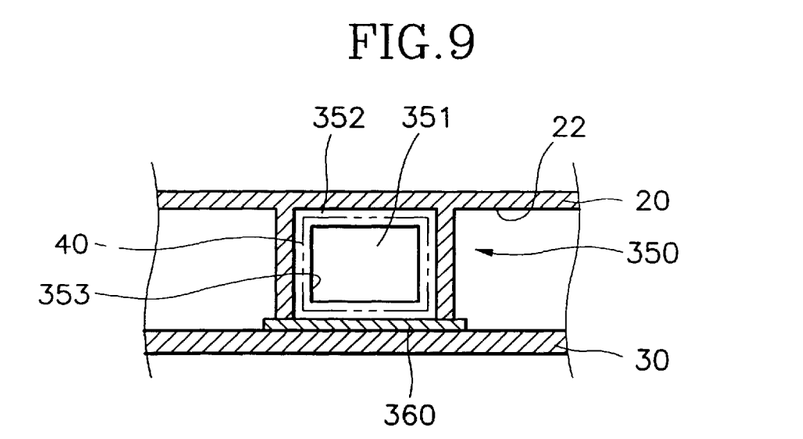
FIG. 9 is a sectional view showing a filtering apparatus for a hard disk drive according to a fifth preferred embodiment of the present invention.

FIG. 9 is a sectional view showing a filtering apparatus for a hard disk drive according to a fifth preferred embodiment of the present invention. Referring to the drawing, a sealing member 360 is installed between a main holder 350 formed on the bottom 22 of the cover member 20 and the base 30. The main holder 350 has a window frame shape where an opening 351 is formed in the central portion thereof. Also, a support groove 352 for supporting the filter 40 is formed at an inner surface is 353 of the opening 351. Thus, at least three sides of the filter 40, inserted into the support groove 352, is encompassed by the support groove 352. The filter 40 can filter particles from the flowing air passing through the opening 351.

The sealing member 360 is installed to prevent generation of a gap between the main holder 350 and the upper surface 32 of the base 30. The sealing member 360 is manufactured of an elastically deformable material such as rubber, and is attached to the upper surface 32 by an adhesive. Also, when the base 30 and the cover member 20 are coupled to each other, the sealing member 360 is elastically deformed due to a coupling force thereof to closely contact the main holder 350, forming a seal therebetween.

Figure 10:
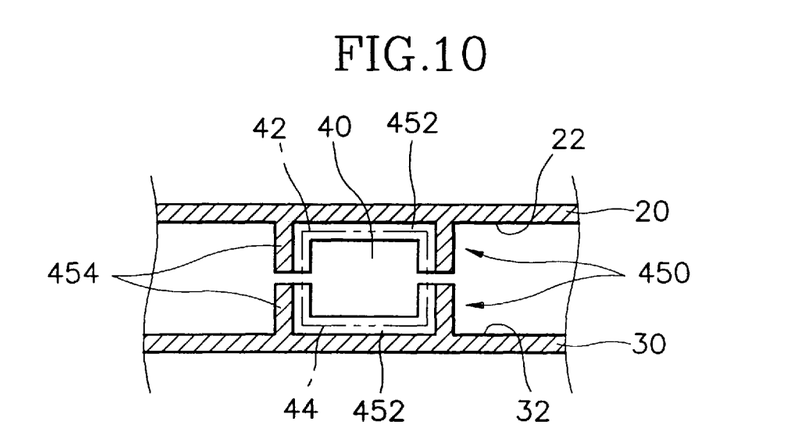
FIG. 10 is a sectional view showing a filtering apparatus for a hard disk drive according to a sixth preferred embodiment of the present invention.

FIG. 10 is a sectional view showing a filtering apparatus for a hard disk drive according to a sixth preferred embodiment of the present invention. Referring to the drawing, a pair of main holders 450 are formed to protrude from the bottom 22 of the cover member 20 and the upper surface 32 of the base 30. Main support portions 454 of the main holders 450 are formed to protrude from the bottom 22 and the upper surface 32 to about the same height. A support groove 452 is formed throughout an auxiliary support portion 456 formed between the main support portions 454 and the main support portion 454. As one end portion 42 and the other end portion 44 and part of both side portions of the filter 40 are inserted into the support groove 452 and encompassed thereby, a gap is not generated.

In each of the fourth through sixth preferred embodiments, as shown in FIG. 3A, a guide portion for guiding air flow may be installed.

As described above, according to the filtering apparatus for a hard disk drive according to the present invention, no gaps are generated between the filter and the ceiling and bottom of the housing. Thus, the filtering performance can be improved compared to the conventional technology.

What is claimed is:

1. A filtering apparatus for a hard disk drive comprising:
a housing in which a hard disk is rotatably installed;
a filter for filtering particles from air flowing in the housing; and
a holder installed at an upper portion and a lower portion of an inside of the housing for supporting the filter by encompassing an upper portion and a lower portion of the filter, so that a gap is not generated between the filter and the upper portion, and between the filter and the lower portion,
wherein the holder comprises a main holder protruding from the upper portion of the inside of the housing and an auxiliary holder protruding from the lower portion of the inside of the housing,
wherein said main holder protruding from the upper portion of the inside of the housing has a support groove for supporting the filter by encompassing one end portion of the filter; and
said auxiliary holder protruding from the lower portion of the inside of the housing corresponds to the main holder and has an accommodating groove for supporting the filter by encompassing the other end portion of the filter,
wherein the one end portion of the filter is an opposite end of the other end portion of the filter, and
wherein the support groove and the accommodating groove face each other with the filter disposed therebetween.

2. A filtering apparatus for a hard disk drive comprising:
a housing in which a hard disk is rotatably installed;
a filter for filtering particles from air flowing in the housing; and
a holder installed at an upper portion and a lower portion of an inside of the housing for supporting the filter by encompassing an upper portion and a lower portion of the filter, so that a gap is not generated between the filter and the upper portion, and between the filter and the lower portion,
wherein the holder comprises:
a main holder protruding from the upper portion of the inside of the housing and having a support groove for supporting the filter by encompassing one end portion of the filter; and
an auxiliary holder protruding from the lower portion of the inside of the housing corresponding to the main holder and having an accommodating groove for supporting the filter by encompassing the other end portion of the filter,
wherein the main holder comprises:
a pair of main support portions protruding to a predetermined height from the upper portion of the inside of the housing and separated a predetermined distance from each other; and
an auxiliary support portion formed between the main support portions to be lower in height than the main support portions, wherein the support groove is formed throughout the main support portions and the auxiliary support portion.

3. A filtering apparatus for a hard disk drive comprising:
a housing in which a hard disk is rotatably installed;
a filter for filtering particles from air flowing in the housing; and
a holder installed at an upper portion and a lower portion of an inside of the housing for supporting the filter by encompassing an upper portion and a lower portion of the filter, so that a gap is not generated between the filter and the upper portion, and between the filter and the lower portion,
wherein the holder comprises:
a main holder protruding from the upper portion of the inside of the housing and having a support groove for supporting the filter by encompassing one end portion of the filter; and
an auxiliary holder protruding from the lower portion of the inside of the housing corresponding to the main holder and having an accommodating groove for supporting the filter by encompassing the other end portion of the filter,
wherein the main holder and the auxiliary holder are formed to have the same height, each of the main holder and the auxiliary holder comprising:
a pair of main support portions protruding from the upper portion and the lower portion of the inside of the housing to a predetermined height and at a predetermined interval; and an auxiliary support portion formed between the main support portions to be lower in height than the main support portions, wherein the support groove and the accommodating groove are formed throughout the main support portions and the auxiliary support portion.

4. A filtering apparatus for a hard disk drive comprising:

a housing in which a hard disk is rotatably installed;

a filter for filtering particles from air flowing in the housing;

a holder installed at an upper portion and a lower portion of an inside of the housing for supporting the filter by encompassing an upper portion and a lower portion of the filter, so that a gap is not generated between the filter and the upper portion, and between the filter and the lower portion; and a first guide portion, extended from one side of the holder to face the hard disk and to maintain a predetermined angle with an input surface of the filter, for guiding air flowing in the housing toward the input surface of the filter.

5. A filtering apparatus for a hard disk drive comprising:

a housing including a base on which a hard disk is rotatably installed and a cover member coupled to the base from above;

a filter for filtering particles from air flowing in the housing; and a holder, installed at a bottom of the cover member and an upper surface of the base, for supporting the filter by encompassing one end portion and the other end portion of the filter, so that a gap is not generated between the filter and the bottom of the cover member, and between the filter and the ceiling of the base, wherein the holder includes a main holder protruding from the bottom of the cover member, and an auxiliary holder protruding from the upper surface of the base, wherein said main holder protruding from the bottom of the cover member has a support groove for supporting the filter by encompassing one end portion of the filter; and said auxiliary holder protruding from the upper surface of the base corresponds to the main holder and has an accommodating groove for supporting the filter by encompassing the other end portion of the filter, wherein the one end portion of the filter is an opposite end of the other end portion of the filter, and wherein the support groove and the accommodating groove face each other with the filter disposed therebetween.

6. A filtering apparatus for a hard disk drive comprising:

a housing including a base on which a hard disk is rotatably installed and a cover member coupled to the base from above;

a filter for filtering particles from air flowing in the housing;

a holder, installed at a bottom of the cover member and an upper surface of the base, for supporting the filter by encompassing one end portion and the other end portion of the filter, so that a gap is not generated between the filter and the bottom of the cover member, and between the filter and the ceiling of the base; and a first guide portion, extended from one side of the holder to face the hard disk and to maintain a predetermined angle with an input surface of the filter, for guiding air flowing in the housing toward the input surface of the filter.

* * * * *